Jan. 31, 1939.   W. J. ANDERSON ET AL   2,145,284
ELASTIC SEAL
Original Filed Oct. 15, 1936

INVENTORS.
William J. Anderson
BY & Samuel S. Roser.
James Harrison Bowen
ATTORNEY.

Patented Jan. 31, 1939

2,145,284

UNITED STATES PATENT OFFICE 2,145,284

ELASTIC SEAL

William J. Anderson, Bronx, and Samuel S. Rosen, New York, N. Y., assignors to Protex Industries, Inc., New York, N. Y., a corporation of New York Original application October 15, 1936, Serial No. 105,674. Divided and this application June 14, 1937, Serial No. 148,178

3 Claims. (Cl. 72—127)

The purpose of this invention is to utilize a caoutchouc substance, commonly known as latex, as a seal or protective coating for sealing buildings and the like.

The invention embodies the application of a substance containing latex to the surfaces, and particularly the outer surfaces, of buildings, and the like, for sealing said buildings against insects and the like, and also insulating said buildings.

This is a divisional application from our copending application with the Serial Number 105,674, and includes the application of latex in combination with other materials, as an agent for sealing buildings, particularly against insects, rodents, and the like.

Most buildings, and particularly residences, camps, and relatively small structures, are subjected, at some time, to ants, cockroaches, termites, and other insects or rodents, and these enter through cracks and crevasses around the base or foundation of the building; and, therefore, it has been found desirable to provide means for forming a positive seal around the foundation, windows and doors of particularly relatively small buildings, and it is also desirable to include in said seal repellents, which are objectionable to both taste and smell, for preventing insects and the like breaking through the seal.

The object of this invention is, therefore, to prevent the entrance of relatively small insects, rodents, and the like, into buildings, by covering surfaces thereof with a relatively thin film of rubber, and thereby sealing all cracks and small openings through which the smallest insects may enter the structure.

Other features and advantages of the invention will appear from the following description taken in connection with the drawing, wherein.

Figure 3:
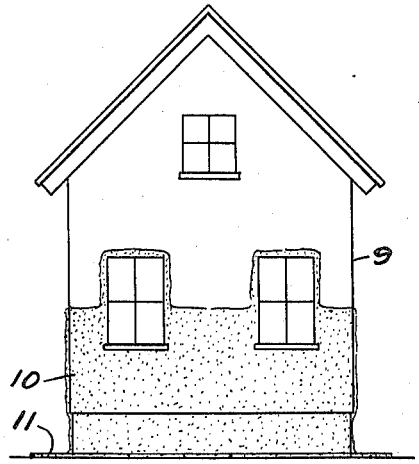

Figure 3 also shows a building with a substance extending around the surface of the ground, and also extending upward over a substantial portion of the building.

In the drawing the application of the substance to buildings is illustrated, wherein numeral 1 indicates a building, numeral 2, a film of caoutchouc substance extending around the foundation of the building, and numeral 3, a layer of the substance extending over the surface of the ground 4 from the intersection of the building foundation with the ground, outward a sufficient distance to prevent rodents, insects, termites and the like entering the building at the intersection of the foundation thereof with the ground.

Figure 1:
Figure 1 is a view showing an elevation of a building, showing a film of latex or other suitable material around the lower part of the foundation and extending over a portion of the ground surrounding the building.
Figure 2:
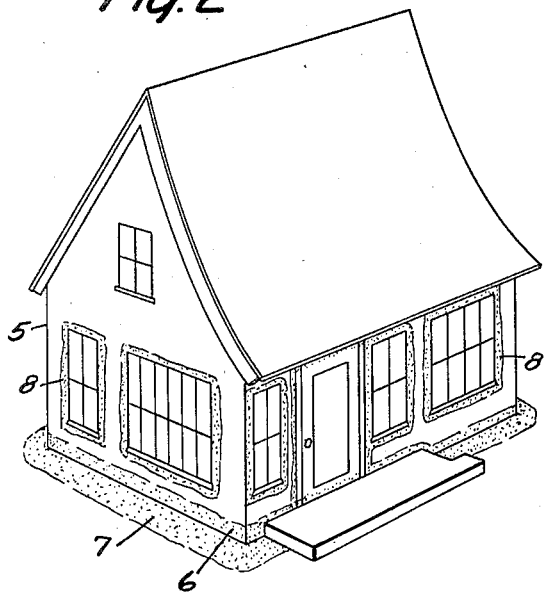
Figure 2 is a view showing the building with the substance around the lower portion, as shown in Figure 1, and also extending around the windows and doors of the lower part of the building.

The building shown in Figure 2 is indicated by the numeral 5, and this is also provided with a film 6 of the substance around the foundation, and a film 7 on the ground, and, in addition, a film 8 extends around the windows and doors, sealing any possible openings between the window and door frames and the wall of the building; and in Figure 3, in which the building is indicated by the numeral 9, the film 10 of the substance is extended upward to cover a major portion of the lower part of the building, and also to cover the intermediate portion of the ground as indicated by the numeral 11.

The material may also be sprayed on paintings, where it will not only preserve, but will accentuate the coloring, and may be used by spraying or dipping as a method of sealing bottles, cigars, cigarettes, furniture, automobiles, or any objects, where it is desired to completely enclose the object to prevent dust, vermin, and the like, passing into the object, or to retain the moisture content, and may also be used for sealing fruit jars, and the like, as in canning, bottling, sealing milk, and many other products. The material may also be painted or sprayed around windows, doors, cracks, and the like, particularly where it is desired to fumigate a room or enclosure, and, after the room is fumigated, the thin film may readily be peeled off by hand without injury to the paint or any parts thereof. It may also be sprayed or painted around the outside of the window or the like, and used as a weather strip to seal an enclosure from the elements.

This substance may also be used as a filler for cartons, particularly containing bottles of valuable perfumes, liquors, and the like, as it may be poured or sprayed in the carton around the bottle or bottles, and as soon as it sets it will hold the bottle in suspension in a resilient cushion. This may be adapted for many other objects, and for many other purposes in packing and shipping.

The material may also be combined with commercial aloes, such as derivatives of the Emphorbia plant, such as lauryl rhodanate, as alkaloid or other repellents and used as a repellent to dogs, animals, and insects, or for mothproofing in which oil of cedar may be used, or as a protection against rodents such as rabbits, gophers, and the like. It may also be used as a floor covering by painting or spraying a substantially heavy film upon a floor, thereby forming a resilient covering somewhat similar to linoleum, which may be continuous, as it is formed directly upon the floor, and may be of any color.

This substance may also be used to cover bags, such as sacks of flour, grain, and the like, in which it not only protects the contents from moisture, but, where it has a bitter taste, it also forms a repellent and protects from rodents and the like. It may also be used to coat burlap or the like, and in this case may have a white pigment, and also a repellent, and the burlap may be wrapped around trunks of trees or used for any purpose.

The invention uses as a foundation a caoutchouc substance, a derivative of many tropical plants obtained from the cortex of certain trees by a process of tapping. A thin shaving of bark is cut away at each tapping to open up the ends of the latex vessels. These vessels permeate the inner layers of the cortex, and when they are cut the latex exudes.

Sulphur, lime, manganese, or any similar anti-tackey substances may be used in combination with latex to prevent its being sticky; commercial aloes may also be added to give the coating a bitter taste, or to make it a repellent to dogs, rabbits, gophers, termites and the like; or fillers may be added to increase the surface tension, or starch to reduce the surface tension.

An aqueous rubber solution which has been found to give a satisfactory coating is one containing about one hundred parts by weight of rubber, about two to three parts by weight of sulphur, about two to three parts by weight of zinc oxide, and about one part by weight of ultra-rapid accelerator such as xanthate or the like. As those skilled in the art know, ultra-rapid accelerators include the class of dithio acids, dithiocarbamate, with or without an addition of a potassium salt of mercaptobenzothiazole, piperidinepenta-methylena-dithiocarbamate, tetramethylthiuram disulfide, zinc dimethyl dithiocarbamate, zinc-diethyl dithiocarbamate, lead-dimethyl dithiocarbamate, and sodium isopropyl xanthate. Usually the solids in the rubber solution can be present to an extent of about thirty-five to about forty per cent by weight. In practice, satisfactory results have been obtained with about thirty-eight per cent by weight of solids. Of course, concentrated rubber solutions can be used. Therefore, a concentrated rubber solution can be used containing about sixty per cent by weight of solids. In the event that it is desired to color the rubber, any appropriate coloring agent may be used. Generally speaking it is preferred to use a pigment color, and it is also preferred to use anti-tackey agents.

It is understood that these proportions may be altered by adding or detracting therefrom, without departing from the spirit of the invention.

The order of addition of the ingredients is important, since many compounding ingredients coagulate latex unless previously dispersed or wet in water or other emulsifying liquid. The above mixing contains very little solid material, and is easily prepared by weighing out the accelerator and zinc oxide, moistening these with water, or dilute ammonia solution, and mixing with the sulphur paste.

A substance, such as hereinbefore described, sprayed, or even painted around the lower portion of a building, will penetrate into the fine openigs or cracks, filling the same, or at least forming a film over the opening, thereby making it absolutely impossible for ants and other insects to penetrate, and with the substance pigmented with a suitable color, it will also provide a neat and attractive appearance.

This substance may also be used to seal around windows and doors of a building, and may be applied on both the inside and outside, or under the surfacing materials. The thin film of latex, applied around the windows and doors, provides a perfect seal, particularly during the winter months, and may be peeled off in the spring without injury to the paint, or surfaces of the materials.

Having thus fully described the invention, what we claim as new, and desire to secure by Letters Patent, is:

1. In a building of the type having walls, and a foundation upon which the walls are mounted, and in which the foundation extends to the ground, sealing means at the intersection of the outer surface of the building and ground comprising a film of rubber covering a portion of the outer surface of the building, and extending over a portion of the surface of the ground surrounding the said building, both of said portions of rubber joined together at the point of intersection between the walls of the building and ground.

2. Building sealing means, as described in claim 1, further characterized in that the said film of rubber extends upward over a substantial part of the building, covering the intersection of the building with the foundation.

3. Building sealing means, as described in claim 1, further characterized in that the said film of rubber is continued around the intersection of the building wall and foundation, and also around the windows and doors thereof.

WILLIAM J. ANDERSON.
SAMUEL S. ROSEN.